June 18, 1968 N. WOLFF ET AL 3,389,333

CONTROL SYSTEM FOR MAINTAINING A DESIRED MAGNETIC FIELD IN A GIVEN SPACE

Filed Feb. 10, 1964 4 Sheets-Sheet 1

June 18, 1968 N. WOLFF ET AL 3,389,333

CONTROL SYSTEM FOR MAINTAINING A DESIRED MAGNETIC FIELD IN A GIVEN SPACE

Filed Feb. 10, 1964 4 Sheets-Sheet 3

United States Patent Office 3,389,333

Patented June 18, 1968

3,389,333

CONTROL SYSTEM FOR MAINTAINING A DESIRED MAGNETIC FIELD IN A GIVEN SPACE

Norman Wolff, Olivette, and Niels C. Andersen, St. Louis, Mo., assignors to Sperry Rand Corporation, New York, N.Y., a corporation of Delaware Filed Feb. 10, 1964, Ser. No. 343,632
10 Claims. (Cl. 324—43)

ABSTRACT OF THE DISCLOSURE

Spaced apart turns of coils define a space in which objects can be positioned, a support is located within that space to hold those objects, a magnetometer is located directly between the spaced apart turns of those coils and immediately adjacent that space so it is subject to essentially the same magnetic field which said coils apply to those objects in that space, a circuit connects the magnetometer to those coils and enables those coils to dynamically and automatically null, adjacent said magnetometer, and thus to substantially null in said space, undesired components of the earth's magnetic field and of magnetic fields due to man-made effects, and a source of magnetic flux lines which develops a predetermined magnetic field adjacent the magnetometer to enable that magnetometer and the circuit and the coils to develop a predetermined magnetic field in the space.

Figure 1:
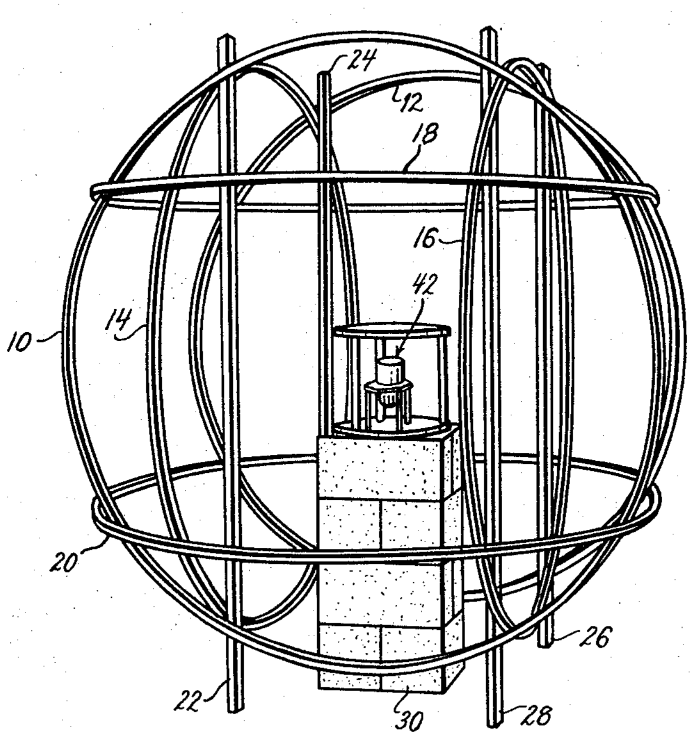

This invention relates to improvements in control systems. More particularly, this invention relates to improvements in control systems which can establish and maintain magnetic fields of predetermined magnitudes and orientations.

It is, therefore, an object of the present invention to provide an improved control system which can establish and maintain a magnetic field of predetermined magnitude and orientation.

In the calibrating and adjusting of some devices, the earth's magnetic field and some man-made magnetic fields can be troublesome. For example, in the aligning of magnetometers and in the aligning of the video tubes for color television sets, the earth's magnetic field and some man-made magnetic fields can be very troublesome. Consequently, it would be desirable to provide a control system which could establish and maintain a magnetic field of predetermined magnitude and orientation in the space where such devices are to be calibrated or adjusted. The present invention provides such a control system; and it is, therefore, an object of the present invention to provide a control system which can establish and maintain a magnetic field of predetermined magnitude and orientation in a space where devices are to be calibrated or adjusted.

The present invention utilizes a plurality of large diameter coils which have the turns thereof spaced apart and disposed at opposite sides of the space where the devices are to be calibrated or adjusted. One of those coils defines an X-axis, another of those coils defines a Y-axis, and still another of those coils defines a Z-axis. The X-axis and the Y-axis lie in the same horizontal plane and are perpedicular to each other; while the Z-axis lies in a vertical plane and is perpendicular to both the X-axis and the Y-axis. A support, such as a turntable, is provided adjacent the point of intersection of the X-axis, the Y-axis and the Z-axis; and that support will hold the device to be calibrated or adjusted. A magnetometer is disposed adjacent that support; and a circuit is provided which includes that magnetometer and the X-axis, the Y-axis, and the Z-axis coils. Where desired, that circuit can cause sufficient current to flow through the X-axis, the Y-axis and the Z-axis coils to substantially null, at the point of intersection of the X-axis, the Y-axis and the Z-axis, the earth's magnetic field and any undesired man-made magnetic fields. Consequently, the control system of the present invention can enable devices to be calibrated or adjusted in a space which has substantially zero magnetic components of force along the X-axis, the Y-axis, and the Z-axis. It is, therefore, an object of the present invention to provide a control system which has coils with the turns thereof spaced apart and disposed at opposite sides of a space where devices can be calibrated or adjusted, which has a magnetometer adjacent that space, and which has a circuit that includes the magnetometer and the coils and that can cause sufficient current to flow through the coils to substantially null, in that space, the earth's magnetic field and any undesired man-made magnetic fields.

In some instances it is desirable to calibrate or adjust devices in a magnetic field that is substantially independent of the earth's magnetic field and of undesired man-made magnetic fields; and hence it would be desirable to provide a control system which could establish and maintain a magnetic field, that was substantially independent of the earth's magnetic field and of undesired man-made magnetic fields and in which a device could be calibrated or adjusted. The present invention provides such a control system; and that control system uses coils which have the turns thereof spaced apart and disposed at opposite sides of a space, disposes a magnetometer close enough to that space to sense the magnetic field in that space but far enough from that space so that the application of small magnitude local magnetic field to that magnetometer can not directly affect the magnetic field within that space, and provides a circuit which includes the magnetometer and the coils. Until such time as a local magnetic field is applied to the magnetometer, the circuit will enable the magnetometer to cause the coils to develop a magnetic field which will substantially null, at the magnetometer and hence in the said space, the earth's magnetic field and any undesirable man-made magnetic fields. When a local magnetic field is applied to the magnetometer, the circuit will enable the magnetometer to cause the coils to develop a magnetic field which will substantially null, at the magnetometer, the earth's magnetic field and any undesirable man-made magnetic fields plus the local magnetic field. The coils will establish substantially the same magnetic field in the said space as they establish adjacent the magnetometer, because that magnetometer is so close to that space. However, because the small magnitude local magnetic field can not directly affect the magnetic field in the said space, the magnetic field which the coils will establish in that space will not only substantially null the earth's magnetic field and any undesired man-made magnetic fields but will establish a magnetic field in that space of a predetermined magnitude and orientation. It is, therefore, an object of the present invention to provide a control system that has coils which have the turns thereof spaced apart and disposed at opposite sides of a space, that disposes a magnetometer close enough to that space to sense the magnetic field in that space but far enough from that space so the application of a small magnitude local magnetic field to that magnetometer can not directly affect the magnetic field within that space, and that provides a circuit which includes the magnetometer and the coils.

Other and further objects and advantages of the present invention should become apparent from an examination of the drawing and accompanying description.

Figure 2:
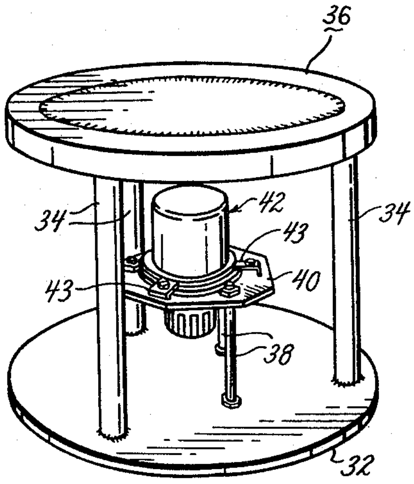
Figure 3:
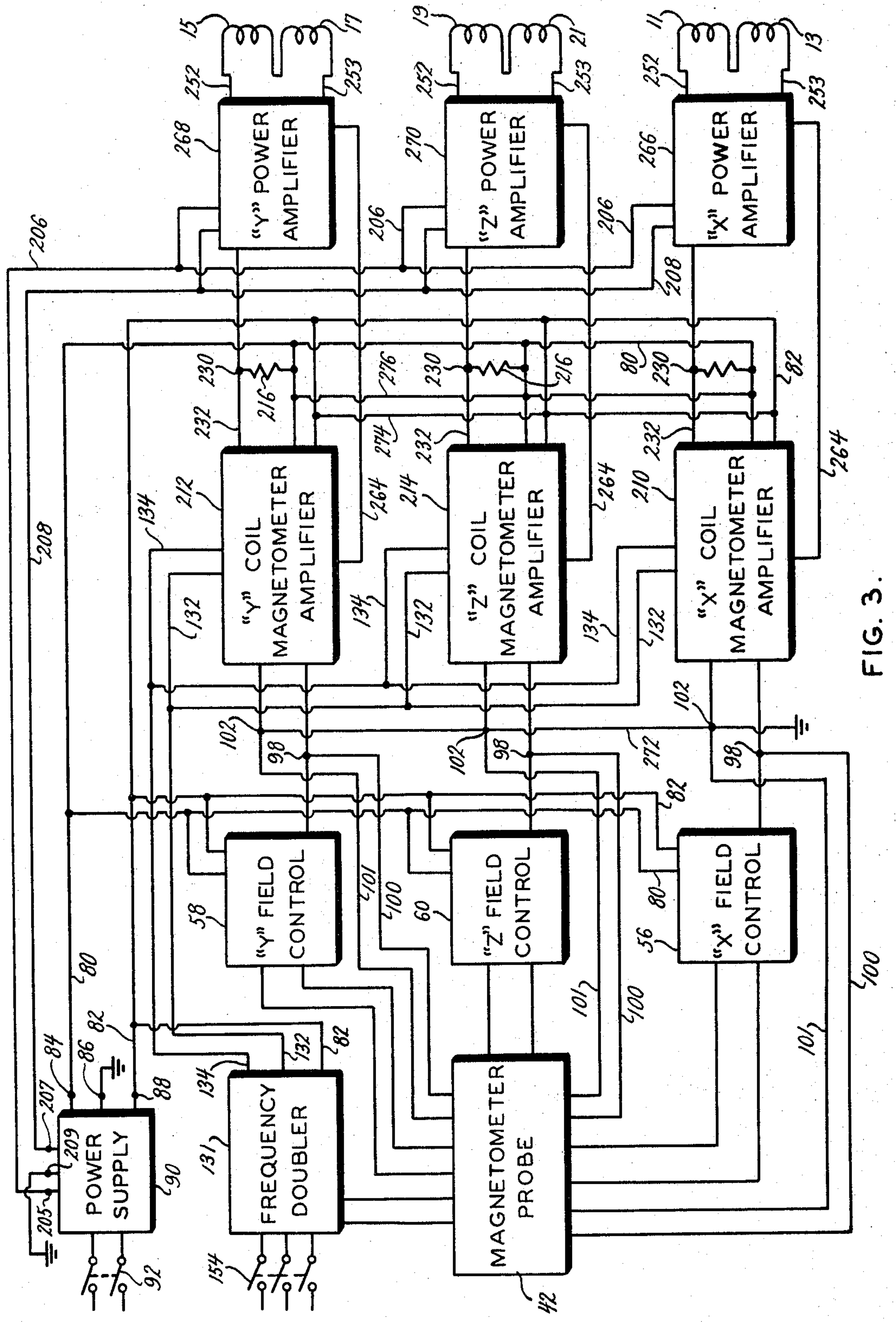
Figure 3A:
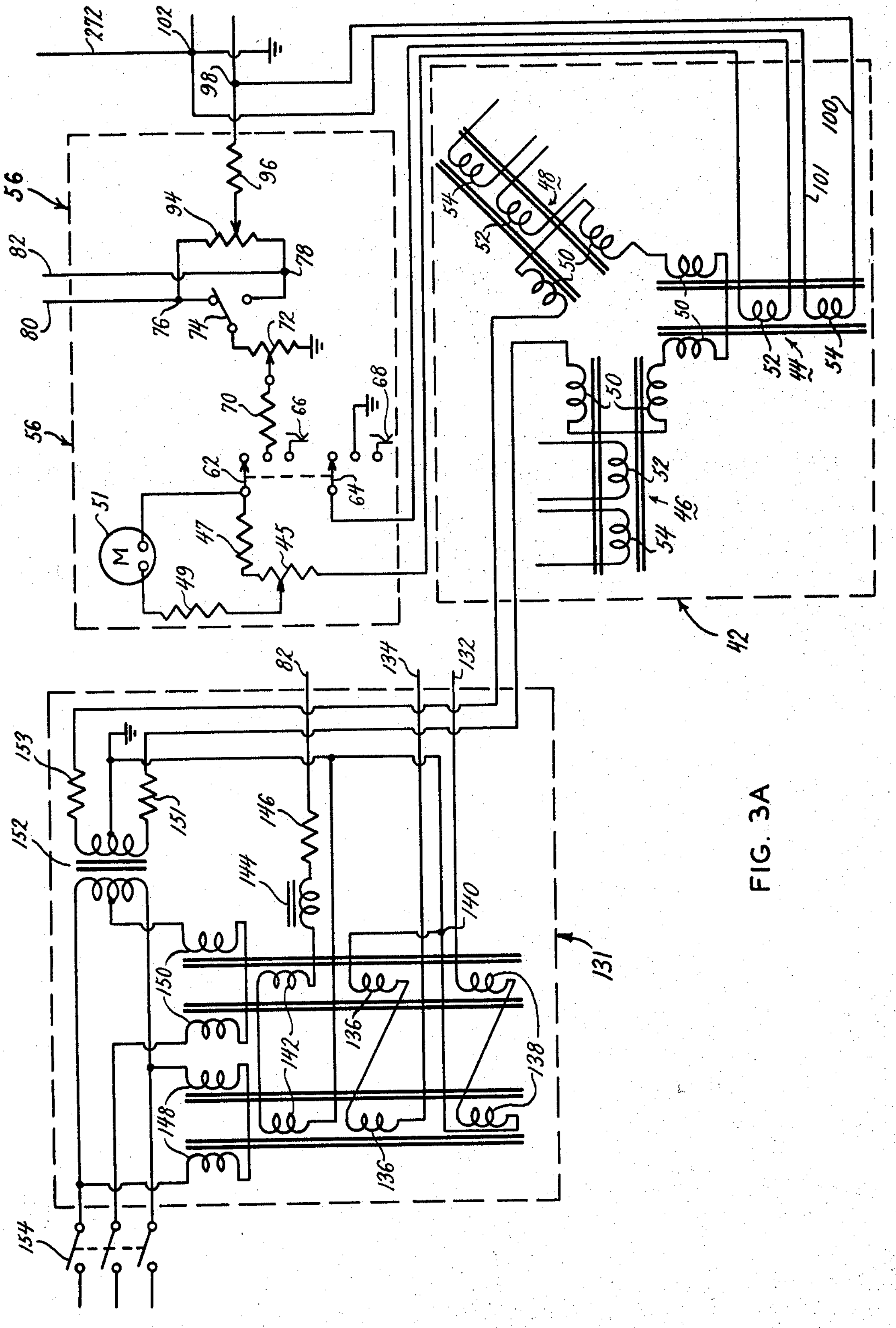
Figures 3B, 4:
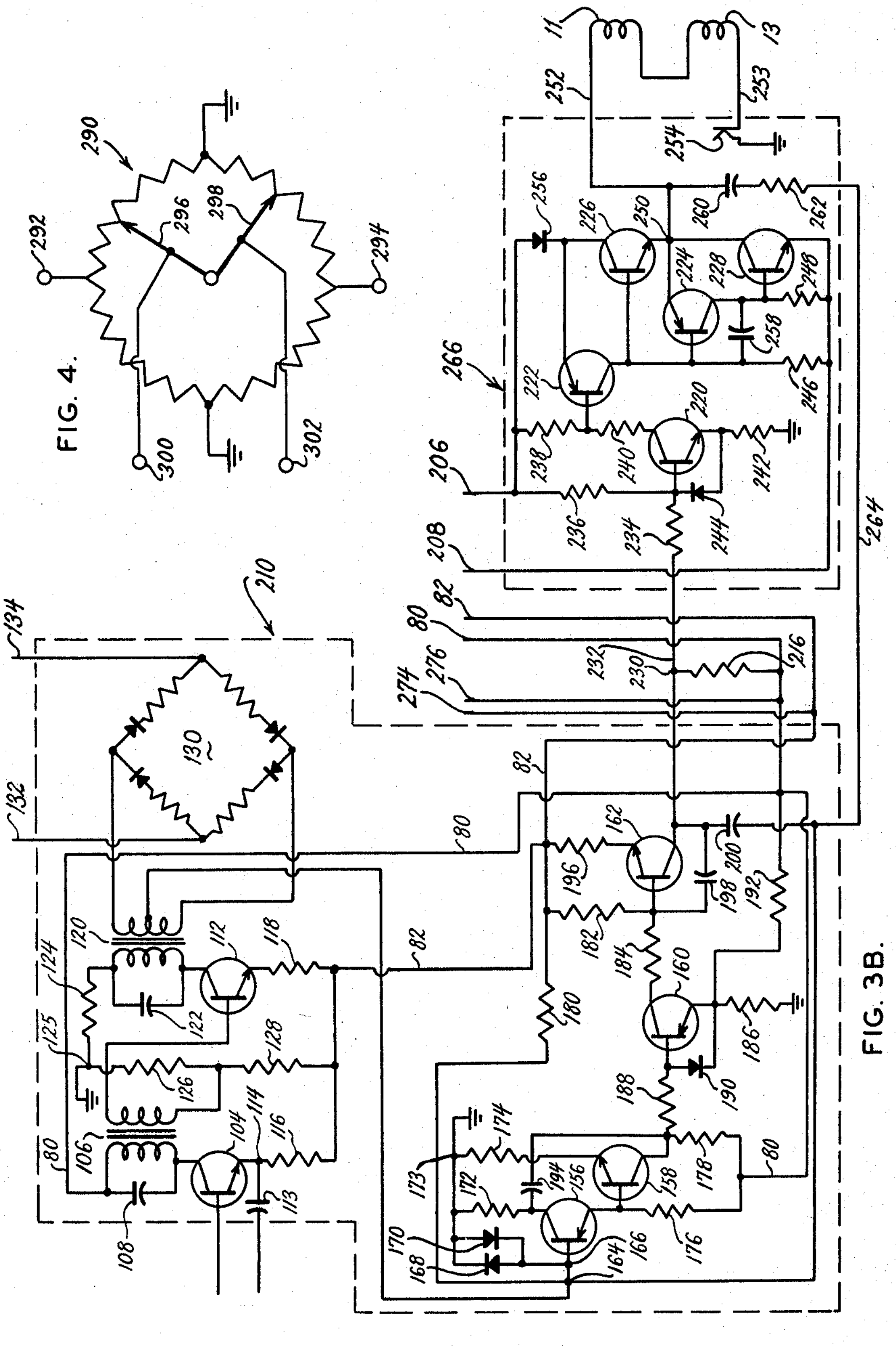

In the drawing, FIG. 1 is a perspective view of three coils which have the turns thereof spaced apart and disposed on opposite sides of a pedestal on which a turntable and a three-axis magnetometer are mounted, FIG. 2 is a perspective view, on a larger scale, of the turntable and magnetometer of FIG. 1, FIG. 3 is a block diagram of one preferred form of circuit for the control system provided by the present invention, FIG. 3A is a schematic diagram of the magnetometer, the frequency doubler, and one of the field control panels for the circuit of FIG. 3, FIG. 3B is a schematic diagram of one of the two-stage, tuned A.C. amplifiers, one of the magnetic demodulators, one of the D.C. amplifiers and one of the D.C. power amplifiers of the circuit of FIG. 3, and FIG. 4 is a schematic showing of a sine-cosine potentiometer which can be used with the control system of the present invention.

Referring to the drawing in detail, the numeral 10 denotes an annulus that supports and confines turns 11 which constitute one-half of an X-axis Helmholtz coil. An annulus 12 supports and confines turns 13 which constitute the other half of that Helmholtz coil. Those annuli are coaxial; and the turns 11 and 13 are wound so they produce magnetic fields of the same polarity.

The numerals 14 and 16 denote annuli that support and confine turns 15 and 17 which constitute the halves of a Y-axis Helmholtz coil. The annuli 14 and 16 are coaxial; and the turns 15 and 17 are wound so they produce magnetic fields of the same polarity. The axis of the annuli 14 and 16 lies in the same horizontal plane in which the axis of the annuli 10 and 12 lies; but the former axis is spaced ninety degrees from the latter axis.

The numerals 18 and 20 denote annuli that support and confine turns 19 and 21 which constitute the halves of a Z-axis Helmholtz coil. The annuli 18 and 20 are coaxial; and the turns 19 and 21 are wound so they produce magnetic fields of the same polarity. The axis of the annuli 18 and 20 is disposed at right angles to the plane which contains the axis of annuli 10 and 12 and the axis of annuli 14 and 16. The turns 11, 13, 15, 17, 19 and 21 are shown in the schematic diagram.

Uprights 22, 24, 26 and 28 are secured to the annuli 10, 12, 14 and 16. Specifically, the upright 22 has portions of the annuli 10 and 14 bolted to it, the upright 24 has portions of the annuli 14 and 12 bolted to it, the upright 26 has portions of the annuli 12 and 16 bolted to it, and the upright 28 has portions of the annuli 16 and 10 bolted to it. The annuli 18 and 20 are suitably secured to the annuli 10, 12, 14 and 16 by brackets or the like.

The annuli 10, 12, 14, 16, 18 and 20, and the uprights 22, 24, 26 and 28 are made of non-magnetic material, as for example, aluminum. Those annuli and those supports have sufficiently large cross sections to enable them to coact together to constitute a rugged and sturdy frame; but they will be relatively light in weight. In one preferred embodiment of the present invention, the diameter of each annulus was eight feet.

The numeral 30 denotes a pedestal which is disposed within the area defined by the lower portions of the annuli 10, 12, 14 and 16. That pedestal will be set at the center of the area defined by the bottoms of the uprights 22, 24, 26 and 28. That pedestal is made from a non-magnetic material; and, in the said preferred embodiment of the present invention, tht pedestal is made of concrete blocks. Mounted atop the pedestal 30, and suitably secured thereto, is a plate 32. Legs 34 are secured to, and extend upwardly from, that plate; and those legs hold and support a turntable 36. That turntable has a stationary portion which is secured to the upper ends of the legs 34, and it has a rotatable portion which can be rotated relative to those legs. The pedestal 30 and the legs 34 are dimensioned so the turntable 36 is below, but very close to, the point where the axes of the X-axis, the Y-axis, and the Z-axis Helmholtz coils intersect.

Legs 38 also are secured to, and extend upwardly from, the plate 32; and those legs have threads on the upper ends thereof. Those threads receive nuts; and some of those nuts underlie a plate 40 while the rest of those nuts overlie that plate. Rotation of those nuts relative to those threads will adjust the attitude and spacing of the plate 40 relative to the plate 32. A three-axis fluxgate magnetometer 42 is mounted on the plate 40 by clamps 43. That magnetometer can be rotated slightly about its vertical axis when the clamps 43 are loosened. Ordinarily, those clamps will fixedly hold that magnetometer against movement relative to the plate 40, and hence against movement relative to the pedestal 30. The magnetometer 42 is disposed below the level of the turntable 36, and is thus displaced below the point of intersection of the axes of the X-axis, and the Z-axis Helmholtz coils.

The three-axis fluxgate magnetometer 42 has an X-coil sensing element 44, and has a Y-coil sensing element 46, and has a Z-coil sensing element 48. Each of those sensing elements has two magnetic cores, a two-section excitation winding, a field nulling winding, and a field signal pickup winding, inasmuch as the sensing elements 44, 46 and 48 are identical, only the sensing element 44 will be described in detail. That sensing element has two seriesed excitation windings 59, has a field nulling winding 52, and has a field signal pickup winding 54

The magnetometer 42 will be mounted so the sensing element 44 has the axis thereof alined with the axis of the annuli 10 and 12, so the sensing element 46 has the axis thereof alined with the axis of the annuli 14 and 16, and so the sensing element 48 has the axis thereof alined with the axis of the annuli 18 and 20. Where that is done, the sensing element 44 will be able to sense any X-axis components of a magnetic field adjacent the magnotometer 42, the sensing element 46 will be able to sense any Y-axis components of that magnetic field, and the sensing element 48 will be able to sense any Z-axis components of that magnetic field. Loosening of the clamps 43 will permit the magnetometer 42 to be rotated until the axes of the sensing elements 44 and 46 are substantially parallel to the axes of the X-axis and Y-axis Helmholtz coils. Rotation of the nuts on the threads at the upper ends of the legs 38 will make it possible to set the axis of the sensing element 48 substantially parallel to the axis of the Z-axis Helmholtz coil.

The numeral 56 generally denotes a field control panel for the sensing element 44. An identical field control panel 58 is provided for the sensing element 46; and an identical field control panel 60 is provided for the sensing element 48. Since the field control panels 56, 58 and 60 are identical, only the field control panel 56 will be described in detail.

The numerals 62 and 64 denote the movable contacts of a selector switch within the field control panel 56; and those movable contacts are ganged together for conjoint movement. The movable contact 64 is connected directly to the lower terminal of the field nulling winding 52; and a resistor 47 and a potentiometer 45 connect the movable contact 62 to the upper terminal of that winding. A resistor 49 connects the movable contact of potentiometer 45 to one terminal of a D.C. microammeter 51 which has its zero setting at the center of the scale thereof; and the other terminal of that meter is connected to the movable contact 62. The scale of the meter 51 is preferably calibrated to represent milligauss. Adjacent the movable contact 62 is a set of three stationary contacts; and adjacent the movable contact 64 is a set of three stationary contacts. The uppermost contact in each set of three stationary contacts is not connected. The lowermost contacts in the two sets of three stationary contacts are, respectively, connected to jacks 66 and 68. The middle contact of the set of three stationary contacts adjacent the movable contact 64 is grounded. The middle contact of the set of three stationary contacts adjacent the movable contact 62 is connected to the movable contact of a potentiometer 72 by a resistor 70. The lower terminal of the potentiometer 72 is grounded, and the upper terminal of that potentiometer is connected to the movable contact of a single pole, double throw switch 74. The upper contact of the switch 74 is connected to the upper terminal of a potentiometer 94 by a junction 76; and the lower contact of the switch 74 is connected to the lower terminal of the potentiometer 94 by a junction 78. A resistor 96 connects the movable contact of the potentiometer 94 with a junction 98 adjacent the right-hand side of field control panel 56.

A conductor 80 extends from the junction 76 to a terminal 84 of a power supply 90. A conductor 82 extends from the junction 78 to a terminal 88 of the power supply 90; and terminal 86 of that power supply is grounded. The power supply 90 has a second grounded terminal 209, and it has terminals 205 and 207. That power supply is of standard and usual design; and it is not, per se, a part of the present invention.

The input of the power supply 90 is connectable to a suitable source of single phase alternating current by a double pole, single throw switch 92. That power supply will, whenever the switch 92 is closed, develop a positive voltage of substantially twenty-four volts at the terminal 205, will develop a negative voltage of substantially twenty-four volts at the terminal 207, will develop a regulated positive D.C. voltage of twenty-four volts at terminal 84, and will develop a D.C. regulated negative voltage of twenty-four volts at terminal 88.

A conductor 100 extends from the junction 98 to the lower terminal of the field signal pickup winding 54 of the sensing element 44 of the magnetometer 42. A conductor 101 extends between the upper terminal of the winding 54 and a grounded junction 102 which is disposed to the right of the field control panel 56.

The numeral 104 denotes an NPN transistor; and the base of that transistor is directly connected to the junction 102. The emitter of that transistor is connected to the junction 98 by a junction 114 and a capacitor 113. That emitter also is connected to negative terminal 88 of the power supply 90 by a resistor 116 and conductor 82. The collector of that transistor is connected to the lower terminal of the primary winding of a transformer 106 and to the lower terminal of a capacitor 108. That capacitor and that primary winding are connected in parallel; and the upper terminals thereof are connected to the positive terminal 84 of the power supply 90 by conductor 80. This means that the base of the transistor 104 is grounded, that the emitter of that transistor is connected to a regulated source of minus twenty-four volts by the resistor 116, and that the collector of that transistor is connected to a regulated source of plus twenty-four volts by the parallel-connected capacitor 108 and the primary winding of transformer 106.

The numeral 112 denotes an NPN transistor which has the base thereof connected to the upper terminal of the secondary winding of the transformer 106. The primary and secondary windings of the transformer 106 are wound so the upper terminal of the secondary winding will be positive whenever the upper terminal of the primary winding is positive. The emitter of the transistor 112 is connected to the negative terminal 88 of the power supply 90 by a resistor 118 and the conductor 82. The collector of that transistor is connected to ground by parallel-connected capacitor 122 and the primary winding of a transformer 120, by a resistor 124, and a junction 125. The lower terminal of the secondary winding of the transformer 106 is connected to ground by resistor 126 and junction 125, and that lower terminal is connected to the negative terminal 88 of the power supply 90 by resistor 128 and conductor 82.

The transformer 120 acts as the signal transformer of a magnetic demodulator of standard and usual design; and a frequency doubler 131 acts as the reference transformer of that magnetic demodulator. The ring of that magnetic demodulator is denoted by the numeral 130; and each leg of that ring consists of a diode and a resistor. Two oppositely-disposed terminals of the ring 130 are directly connected to the upper and lower terminals of the secondary winding of transformer 120. One of the other two terminals of the ring 130 is connected to the lower terminal of the left-hand winding 136 of frequency doubler 131 by a conductor 134; while the second of the other two terminals of that ring is connected to the upper terminal of the right-hand winding 138 of that frequency doubler by a conductor 132. The upper terminal of the left-hand winding 136 is directly connected to the lower terminal of the right-hand winding 136; and the lower terminal of the right-hand winding 138 is directly connected to the upper terminal of the left-hand winding 138. The upper terminal of the right-hand winding 136 and the lower terminal of the left-hand winding 138 are connected together and are also connected to ground by a junction 140.

The frequency doubler 131 is a magnetic frequency doubler; and it has four magnetic cores. That frequency doubler has windings 148 that are wound on two of the four magnetic cores; and those windings are connected in series and are connected across two phases of a three phase line. That frequency doubler also has windings 150 that are wound on the other two magnetic cores; and those windings are connected in series with each other and with the third phase of that three phase line and the center tap of the primary winding of a transformer 152. The outer terminals of that primary winding are connected to the said two phases of the three phase line.

One of the outer terminals of the center-tapped secondary winding of the transformer 152 is connected to the upper winding 50 of sensing element 46 by a resistor 151, while the other outer terminals of that center-tapped secondary winding is connected to the upper winding 50 of sensing element 48 by a resistor 153. The lower winding 50 of sensing element 46 is directly connected to the left-hand winding 50 of sensing element 44, while the right-hand winding 50 of the latter sensing element is directly connected to the lower winding 50 of sensing element 48. As a result, the windings 50 of the sensing elements 46, 44 and 48 are connected in series between the outer terminals of the secondary winding of transformer 152. The center tap of that secondary winding is grounded.

A three pole, single throw switch 154 can connect the three phase line to a suitable source of three-phase alternating current. In the said preferred embodiment of the present invention, the switch 154 selectively connects the three-phase line to a source of three-phase four hundred cycle alternating current.

The frequency doubler 131 also has bias windings 142; and those windings are connected in series. The lower terminal of the left-hand winding 142 is grounded, while the lower terminal of the right-hand winding 142 is connected to the negative terminal 88 of the power supply 90 by an inductor 144, a resistor 146, and the conductor 82.

Whenever the switch 154 is closed, the frequency doubler 131 will supply approximately fifty volts at eight hundred cycles per second to the ring 130 of the ring demodulator; and the transformer 152 will supply four hundred cycles per second at low voltage to the windings 50 of the sensing elements 46, 44 and 48. The capacitor 108 and the primary winding of the transformer 106 coact the constitute a parallel-resonant circuit; and that circuit is tuned to resonate at eight hundred cycles per second. Similarly, the capacitor 122 and the primary winding of the transformer 120 coact to constitute a parallel-resonant circuit; and that circuit also is tuned to resonate at eight hundred cycles per second. This means that those resonant circuits are tuned to resonate at a harmonic of the alternating current supplied to the excitation windings 50 of the sensing elements 46, 44 and 48 of the magnetometer 42. The center tap of the secondary winding of the transformer 120 is connected to a junction 164 which is disposed to the left of the ring 130.

The numeral 156 denotes a PNP transistor, the numeral 158 denotes an NPN transistor, the numeral 160 denotes a PNP transistor, and the numeral 162 denotes an NPN transistor. The base of the transistor 156 is connected to the center tap of the secondary winding of transformer 120 by junctions 166 and 164. The emitter of that transistor is connected to the positive terminal 84 of the power supply 90 by a resistor 176 and the conductor 80; and the collector of that transistor is connected to ground by a resistor 172 and a junction 173. Back-to-back diodes 168 and 170 are connected between the base of transistor 156 and ground by the junctions 166 and 173.

The base of transistor 158 is connected to the upper terminal of the resistor 176; and the emitter of that transistor is connected to ground by a resistor 174 and junction 173. The collector of that transistor is connected to the positive terminal 84 of the power supply 90 by a resistor 178 and conductor 80.

The transistor 160 has the base thereof connected to the upper termnial of resistor 178 by a resistor 188. That base also is coupled to the lower terminal of resistor 172 by resistor 188 and a capacitor 194. The emitter of the transistor 160 is connected to a junction between a resistor 186 which is connected to ground and a resistor 192 which is connected to the positive terminal 84 of power supply 90 by conductor 80. A diode 190 has the anode thereof connected to the base of transistor 160 and has the cathode thereof connected to the emitter of that transistor. The collector of transistor 160 is connected to the negative terminal 88 of the power supply 90 by resistors 184 and 182 and conductor 82.

Transistor 162 has the base thereof connected to a junction intermediate the resistors 182 and 184, and it has the emitter thereof connected to the negative terminal 88 of the power supply 90 by a resistor 196 and conductor 82. The collector of that transistor is connected to the positive terminal 84 of that power supply by a junction 230, a resistor 216, and conductor 80. A capacitor 198 is connected between the base and collector of transistor 162; and a capacitor 200 is connected between the collector of that transistor and the base of transistor 156 by junctions 164 and 166. A resistor 180 is connected between the junction 166 and the negative terminal 88 of power supply 90 by junction 164 and by conductor 82.

The transistors 104 and 112, the transformers 106 and 120, the capacitors 108 and 122, and the resistors 116, 118, 124, 126 and 128 constitute a two-stage tuned A.C. amplifier. That amplifier is tuned to eight hundred cycles. The transistors 156, 158, 160 and 162, and the components associated therewith, constitute a D.C. amplifier. That two-stage A.C. tuned amplifier, the ring 130 of the magnetic demodulator, and that D.C. amplifier can be mounted on a panel; and that panel is denoted by the numeral 210. An identical panel 212 is provided for the sensing element 46, and an identical panel 214 is provided for the sensing element 48.

The numeral 220 denotes an NPN transistor, the numeral 222 denotes a PNP transistor, the numeral 224 denotes a PNP transistor, the numeral 226 denotes an NPN transistor, and the numeral 228 denotes an NPN transistor. The base of the transistor 220 is connected to the junction 230 by a resistor 234 and a conductor 232. The emitter of that transistor is connected to ground by a resistor 242. A diode 244 has the anode thereof connected to the emitter and has the cathode thereof connected to the base of that transistor. The collector of that transistor is connected to the positive terminal 205 of the power supply 90 by resistors 240 and 238 and conductor 206. The base of the transistor 220 also is connected to a junction between resistor 234 and a resistor 236 which is connected to the positive terminal 205 of the power supply 90 by conductor 206.

The base of the transistor 222 is connected to a junction between the resistors 238 and 240; and the emitter of that transistor is connected to the positive terminal 205 of the power supply 90 by a diode 256 and the conductor 206. The collector of that transistor is connected to the negative terminal 207 of that power supply by a resistor 246 and conductor 208.

The base of the transistor 224 is connected to the upper terminal of resistor 246; and the emitter of that transistor is connected to ground via a junction 250, a conductor 252, turns 11 and 13 of the X-axis Helmholtz coil, a conductor 253 and a jack 254. The collector of that transistor is connected to the negative terminal 207 of the power supply 90 by a resistor 248 and conductor 208. A capacitor 258 is connected between the collector and the base of the transistor 224.

The base of the tranistor 226 is connected to the upper terminal of resistor 246; and the emitter of that transistor is connected to ground via junction 250, conductor 252, turns 11 and 13 of the X-axis Helmholtz coil, conductor 253, and jack 254. The collector of that transistor is connected to the positive terminal 205 of the power supply 90 by diode 256 and conductor 206. The base of the transistor 228 is connected to the upper terminal of resistor 248, and the emitter of that transistor is connected directly to the negative terminal 207 of power supply 90 by conductor 208. The collector of that transistor is connected to ground via junction 250, conductor 252, turns 11 and 13 of the X-axis Helmholtz coil, conductor 253 and jack 254. Junction 250 is connected to the base of transistor 156 by a capacitor 260, a resistor 262, a conductor 264, and junctions 164 and 166.

The transistors 220, 222, 224, 226 and 228, and the components associated therewith, constitute a D.C. power amplifier which is generally denoted by the numeral 266. Identical power amplifiers 268 and 270 are, respectively, connected to the terminals of the Y-axis and Z-axis Helmholtz coils.

A conductor 272 extends from the junction 102, adjacent the upper input of panel 210, to junctions adjacent the upper inputs of panels 212 and 214. As a result, all of those upper inputs will be at ground potential.

A conductor 274 connects the conductor 82 adjacent panel 210 with the conductors 82 adjacent the panels 212 and 214. Similarly, a conductor 276 connects the conductor 80 adjacent panel 210 with the conductors 80 adjacent the panels 212 and 214. As a result, the voltages supplied to those panels by the conductors 80 and 82 will be substantially identical.

Whenever the movable contacts 62 and 64 of the field control panels 56, 58 and 60 are in their uppermost positions, the field nulling windings 52 of the sensing elements 44, 46 and 48 will be isolated from the rest of the circuit of the control system. Whenever the movable contacts 62 and 64 of the field control panels 56, 58 and 60 are in their lowermost positions, the field nulling windings 52 of the sensing elements 44, 46 and 48 will be connected to the jacks 66 and 68 of those field control panels; and those windings will respond to any voltages which are applied to those jacks. Whenever the movable contacts 62 and 64 of the field control panels 56, 58 and 60 are in their middle positions, the field nulling windings 52 of the sensing elements 44, 46 and 48 will be connected between ground and the left-hand terminals of the resistors 70 of the various field control panels.

The magnetometer 42 is shown as a second harmonic fluxgate magnetometer which has three sensing elements. The cores of those sensing elements are made from material which shows high permeability and saturation at low magnetizing field strength. The four hundred cycle alternating current which is supplied to the excitation windings 50 of the sensing elements 46, 44 and 48 by the transformer 152 will have sufficient amplitude to saturate the cores of those sensing elements.

Whenever the movable contact of potentiometer 94 of field control panel 56 is in its middle position, whenever the movable contacts 62 and 64 of that field control panel are in their uppermost positions, and whenever the sensing element 44 is substantially free of a unidirectional external component of magnetic force parallel to the axes of the magnetic cores thereof, the current flowing through the excitation windings 50 of that sensing element will induce equal but opposite voltages in the field signal pick-up winding 54 of that sensing element; and hence the total output of that winding will be zero. With zero output from the winding 54, the emitter of transistor 104 will be more negative than the grounded base of that transistor; and hence that transistor will be conductive. The resulting flow of current through the primary winding of transformer 106 will be steady, and hence no voltage will be induced in the secondary winding of that transformer. With no voltage appearing across that secondary winding, the voltage at the junction between resistors 126 and 128, and hence the voltage at the base of transistor 112, will be less negative than the voltage at the emitter of that transistor; and, as a result, transistor 112 will be conductive. The resulting flow of current through the primary winding of transformer 120 will be steady, and hence no voltage will be induced in the secondary winding of that transformer. The frequency doubler 131 will be supplying eight hundred cycle alternating current to the ring 130 of the magnetic demodulator; but, with no signal from the signal transformer 120, the output of that magnetic demodulator will be zero.

Current will flow from the positive terminal 84 of power supply 90 via conductor 80, resistor 176 in panel 210, the emitter-base circuit of transistor 156, junctions 166 and 164, resistor 180, and conductor 82 to the negative terminal 88 of that power supply. The flow of current through that emitter-base circuit will be limited; but it will be sufficient to make transistor 156 conductive.

The resistance of resistor 180 is many times greater than the resistance of resistor 176, and hence the voltage at the top terminal of resistor 176—and at the base of transistor 158—will be positive and will be greater than the voltage at the emitter of that transistor. Consequently, that transistor will be conductive.

Current will flow from the positive terminal of power supply 90 via conductor 80, resistor 192 in panel 210, resistor 186, and ground to the grounded terminal 86 of that power supply; and that flow of current will make the emitter of transistor 160 a couple of volts positive. The resistance of resistor 178 is many times greater than the resistance of resistor 192, and the resistances of resistors 174 and 186 are equal; and hence the current flowing through resistor 178, transistor 158, and resistor 174 will make the base of transistor 160 less positive than the emitter of that transistor. As a result, that transistor will be conductive.

The resulting flow of current through resistor 182 will make the base of transistor 162 positive relative to the emitter of that transistor. Consequently, the transistor 162 will be conductive.

Current will flow from the positive terminal 205 of power supply 290 via conductor 206, resistor 236 of power amplifier 266, the base-emitter circuit of transistor 220, resistor 242, and ground to the grounded terminal 209 of that power supply; and the flow of current in that base-emitter circuit will make that transistor conductive. The resulting voltage drop across resistor 238 will make the base of transistor 222 less positive than the emitter of that transistor; and hence that transistor will be conductive. The resulting voltage drop across resistor 246 will make the voltages at the bases of transistors 224 and 226 close to ground level; and, since the emitters of those transistors are connected to ground via junction 250, conductor 252, turns 11 and 13 of the X-axis Helmholtz coil, conductor 253, and jack 254, those transistors will be substantially non-conductive. As long as the transistor 224 is substantially non-conductive, the voltage at the base of transistor 228 will be essentially twenty-four volts negative; and hence that transistor will be substantially non-conductive. This means that whenever the movable contact of potentiometer 94 of field control panel 56 is in its middle position, whenever the movable contacts 62 and 64 of that field control panel are in their uppermost positions, and whenever the sensing element 44 is substantially free of a unidirectional external component of magnetic force parallel to the axes of the magnetic cores thereof, substantially no current will flow through the X-axis Helmholtz coil. Similary, whenever the movable contact of potentiometer 94 of field control panel 58 is in its middle position, whenever the movable contacts 62 and 64 of that field control panel are in their uppermost positions, and whenever the sensing element 46 is substantially free of a unidirectional, external component of force parallel to the axes of the magnetic cores thereof, substantially no current will flow through the Y-axis Helmholtz coil. Also, whenever the movable contact of potentiometer 94 of field control panel 60 is in its middle position, whenever the movable contacts 62 and 64 of that field control panel are in their uppermost positions, and whenever the sensing element 48 is substantially free of a unidirectional, external component of force parallel to the axes of the magnetic cores thereof, substantially no current will flow through the Z-axis Helmholtz coil.

Whenever a unidirectional, external component of magnetic force is applied to the sensing element 44 so it is parallel to the axes of the cores of that sensing element, that component of magnetic force will tend to magnetize both of those cores in the same direction, whereas the four hundred cycle alternating current in the excitation windings 50 will tend to magnetize one of those cores in that same direction while tending to magnetize the other of those cores in the opposite direction. The resulting phase-shift in the voltage induced in the field signal pickup winding 54 will develop an output voltage across that winding which primarily has a frequency of eight hundred cycles per second—the frequency to which the parallel-resonant circuits of the two-stage tuned A.C. amplifier are tuned.

That output voltage will recurrently make the emitter of transistor 104 more negative and less negative relative to the grounded base of that transistor; and hence will recurrently increase and decrease the conductivity of that transistor. The resulting variations in the current flowing through the primary winding of transformer 106 will induce corresponding variations in the voltage across the secondary winding of that transformer. Those voltage variations will recurrently make the base of transistor 112 more positive and less positive relative to the emitter of that transistor; and hence will recurrently increase and decrease the conductivity of that transistor. The resulting variations in the current flowing through the primary winding of transformer 120 will induce an A.C. signal in the secondary winding of that transformer. That A.C. signal will have the same frequency as the reference current supplied by the frequency doubler 131; and, depending upon the direction of the unidirectional, external component of magnetic force applied to the sensing element 44, that A.C. signal will be in phase with, or will be one hundred and eighty degrees out of phase with, that reference current.

If that A.C. signal is in phase with the reference current supplied by the frequency doubler 131, the voltage at the center tap of the secondary winding of transformer 120, and hence at the base of transistor 156, will be positive relative to ground. That voltage will cause the conductivity of transistor 156 to decrease, thereby causing the voltage at the base of transistor 158 to increase, and also causing the voltage at the collector of transistor 156 to decrease. The increased voltage at the base of transistor 158 will make that transistor more conductive; and the resulting increase in current flowing through resistor 178 will decrease the voltage at the collector of that transistor. The decrease in voltage at the collector of transistor 158 will be applied to the base of transistor 160 by resistor 188, and the decrease in voltage at the collector of transistor 156 will be coupled to the base of transistor 160 by capacitor 194 and resistor 188, and hence the transistor 160 will become more conductive. The resulting increase in the current flowing through resistor 182 will cause the voltage at the base of transistor 162 to become less negative; and, thereupon, that transistor will become more conductive.

The resulting increased voltage drop across resistor 216 will decrease the voltage at the base of transistor 220, thereby making that transistor less conductive. Less current will flow through resistor 238, and hence the base of transistor 222 will become more positive, and that transistor will become less conductive. The resulting decrease in voltage drop across resistor 246 will make the bases of transistors 224 and 226 more negative. Transistor 226 will continue to be substantially non-conductive, but transistor 224 will become conductive. The resulting increased voltage drop across resistor 248 will make the base of transistor 228 less negative; and hence that transistor will become conductive. Thereupon, current will flow from ground via jack 254, conductor 253, turns 13 and 11, conductor 252, junction 250, the collector-emitter circuit of transistor 228, conductor 208, negative terminal 207 of power supply 90, and terminal 209 to ground. That current flow will cause the X-axis Helmholtz coil to develop a magnetic component of force which is parallel to the cores of the sensing element 42 and which will buck, and substantially null, the unidirectional, external magnetic component of force applied to the cores of that sensing element. The magnetic component of force from the X-axis Helmholtz coil also will establish an X-axis component of magnetic force in the space above, but immediately adjacent, the turntable 36.

If, on the other hand, the unidirectional, external magnetic component of force applied to the cores of the sensing element 44 is in the opposite direction, the A.C. signal developed in the secondary winding of signal transformer 120 of the magnetic demodulator will be one hundred and eighty degrees out of phase with the reference current supplied by the frequency doubler 131. The voltage at the center tap of the secondary winding of transformer 120 will then be negative, rather than positive, relative to ground; and that voltage will make transistor 156 more conductive. The resulting increase in voltage drop across resistor 176 will make the base of transistor 158 less positive, and the resulting increase in voltage drop across resistor 172 will cause the voltage at the collector of transistor 156 to increase. The decreased voltage at the base of transistor 158 will make that transistor less conductive; and the resulting decrease in current flowing through resistor 178 will increase the voltage at the collector of that transistor. The increase in voltage at the collector of transistor 158 will be applied to the base of transistor 160 by resistor 188, and the increase in voltage at the collector of transistor 156 will be coupled to the base of transistor 160 by capacitor 194 and resistor 188, and hence the transistor 160 will become less conductive. The resulting decrease in voltage drop across resistor 182 will cause the base of transistor 162 to become more negative, and hence will make that transistor less conductive.

The resulting decreased voltage drop across resistor 216 will increase the voltage at the base of transistor 220, thereby making that transistor more conductive. More current will flow through resistor 238, and hence the base of transistor 222 will become less positive, and that transistor will become more conductive. The resulting increase in voltage drop across resistor 246 will make the bases of transistors 224 and 226 positive as to ground. Transistor 224 will be non-conductive, but transistor 226 will become conductive. Because transistor 224 is non-conductive, the transistor 228 also will be non-conductive.

Current will flow from positive terminal 205 of power supply 90 via conductor 206, diode 256, transistor 226, junction 250, conductor 252, turns 11 and 13 of the X-axis Helmholtz coil, conductor 253, jack 254, and ground to the grounded terminal 209 of that power supply. That current flow will cause the X-axis Helmholtz coil to develop a magnetic component of force which is parallel to the cores of the sensing element 42 and which will buck, and substantially null, the unidirectional, external magnetic component of force applied to the cores of that sensing element. The magnetic component of force from the X-axis Helmholtz coil also will establish an X-axis component of magnetic force in the space above, but immediately adjacent, the turntable 36.

This means that if a unidirectional, external magnetic component of force is applied to the cores of the sensing element 44 in one direction, the X-axis Helmholtz coil will develop a magnetic component of force which is parallel to but oppositely directed of that magnetic component of force, which is substantially equal to that magnetic component of force, and which will provide zero magnetic components of force at those cores along the X-axis thereof. On the other hand, if that unidirectional, external magnetic component of force is applied to the cores of the sensing element 44 in the opposite direction, the X-axis Helmholtz coil will develop a magnetic component of force which is parallel to but oppositely directed of that magnetic component of force, which is substantially equal to that magnetic component of force, and which will provide zero magnetic components of force at those cores along the X-axis thereof.

The sensing element 46, the panel, 212, the power amplifier 268, and the turns 15 and 17 of the Y-axis Helmholtz coil will operate similarly when a unidirectional, external magnetic component of force is applied to the sensing element 46. Specifically, the Y-axis Helmholtz coil will develop a magnetic component of force at the magnetometer 42 which will buck and substantially null the unidirectional, external magnetic component of force applied to the sensing element 46. Also, the sensing element 48, the panel 214, the power amplifier 270, and the turns 19 and 21 of the Z-axis Helmholtz coil will operate similarly when a unidirectional, external magnetic component of force is applied to the sensing element 48. Specifically, the Z-axis Helmholtz coil will develop a magnetic component of force at the magnetometer 42 which will buck and substantially null the unidirectional, external magnetic component of force applied to the sensing element 48.

Because the magnetometer 42 is disposed a few inches below the turntable 36, the magnetic field at that magnetometer will have X-axis magnetic components of force, will have Y-axis magnetic components of force, and will have Z-axis magnetic components of force which are slightly different from the X-axis magnetic components of force, the Y-axis magnetic components of force, and the Z-axis magnetic components of force of the magnetic field to which the device atop the turntable 36 is exposed. This means that if the X-axis, the Y-axis and Z-axis Helmholtz coils provide X-axis magnetic components of force, Y-axis magnetic components of force, and Z-axis magnetic components of force which make the magnetic field at the magnetometer 42 substantially zero, the magnetic field to which the device atop the turntable 36 is exposed will not be substantially zero. However, it is possible to apply compensatory X-axis magnetic components of force, to apply compensatory Y-axis magnetic components of force, and to apply compensatory Z-axis magnetic components of force, respectively, to the sensing elements 44, 46 and 48, and thereby enable the X-axis, the Y-axis and the Z-axis Helmholtz coils to make the magnetic field to which the device atop the turntable 36 is exposed substantially zero.

Specifically, a three-axis magnetometer can be set atop the turntable 36, and then the movable contacts of the potentiometers 94 in the field control panels 56, 58 and 60 can be moved up or down until that magnetometer indicates that the magnetic field in the space above, but immediately adjacent, the turntable 36 is substantially zero. If any of those movable contacts is shifted upwardly, current will flow from positive terminal 84 of power supply 90 via conductor 80, junction 76, the upper section and movable contact of potentiometer 94, resistor 96, junction 98, conductor 100, field signal pickup winding 54, conductor 101, junction 102, and ground to the grounded terminal 86 of that power supply. That flow of current will develop a compensatory magnetic component of force in the cores of the appropriate sensing element; and the alternating magnetic fields developed by the excitation windings 50 of that sensing element will coact with that compensatory magnetic component of force to cause the corresponding Helmholtz coil to develop a magnetic field which will substantially null the compensatory magnetic component of force in the cores of the sensing element, and will also provide substantially zero magnetic components of force in the space above, but immediately adjacent, the turntable 36. If any of those movable contacts is shifted downwardly, current will flow from the grounded terminal 86 of power supply 90 via ground, junction 102, conductor 101, field signal pickup winding 54 of the appropriate sensing element, conductor 100, junction 98, resistor 96, the movable contact and lower section of potentiometer 94, junction 78, and conductor 82 to the negative terminal 88 of that power supply. That flow of current will develop a compensatory magnetic component of force in the cores of the appropriate sensing element; and the alternating magnetic fields developed by the excitation windings 50 of that sensing element will coact with that compensatory magnetic component of force to cause the corresponding Helmholtz coil to develop a magnetic field which will substantially null the compensatory magnetic component of force in the cores of the sensing element, and will also provide substantially zero magnetic components of force in the space above, but immediately adjacent, the turntable 36.

The compensatory magnetic component of force in the cores of the appropriate sensing element will be large enough to enable the magnetometer 42 and the circuit of the control system of the present invention to cause the appropriate Helmholtz coil to develop the required magnetic field. However, that compensatory magnetic component of force is much too small to directly affect the magnetic field in the space above, but immediately adjacent, the turntable 36. All of this means that by appropriately setting the movable contacts of the potentiometers 94 in the field control panels 56, 58 and 60, it is possible to establish and maintain a substantially zero magnetic field in the space above, but immediately adjacent, the turntable 36 even though the magnetometer 42 is disposed a few inches below that turntable.

Whenever it is desirable to calibrate or adjust a device while that device is disposed within a magnetic field which has a predetermined magnitude and orientation, the movable contacts 62 and 64 of the field control panels 56, 58 and 60 will be shifted into their middle positions. Also, the movable contacts of the switches 74 of those field control panels will be shifted into their upper or lower positions, and the movable contacts of the potentiometers 72 of those field control panels will be shifted up or down until the desired milligauss readings are noted on the meters 51 of those field control panels.

If any of the movable contacts of the switches 74 is shifted into its upper position, current will flow from the positive terminal 84 of the power supply 90 via conductor 80, junction 76, the upper and movable contacts of switch 74, the upper section and movable contact of potentiometer 72, resistor 70, contact 62, resistor 47, potentiometer 45, field nulling winding 52, movable contact 64, and ground to the grounded terminal 86 of that power supply. The resulting flow of current through the winding 52 will develop a unidirectional magnetic component of force adjacent the cores of the appropriate sensing element which will be too small to directly affect the magnetic field in the space that is above, but immediately adjacent, the turntable 36. However, that unidirectional magnetic component of force will coact with the alternating magnetic fields developed by the excitation windings 50 of that sensing element to cause the corresponding Helmholtz coil to develop a magnetic field which will, adjacent the magnetometer 42, substantially null that unidirectional magnetic component of force, and which will establish the desired magnetic component of force in the space that is above, but immediately adjacent, the turntable 36.

If any of the movable contacts of the switches 74 is moved into its lower position, current will flow from the grounded terminal 86 of power supply 90 via ground, movable contact 64, the field nulling winding 52 of the appropriate sensing element, potentiometer 45, resistor 47, movable contact 62, resistor 70, the movable contact and upper section of potentiometer 72, the movable and lower contacts of switch 74, junction 78, and conductor 82 to the negative terminal 88 of that power supply. The resulting flow of current through the winding 52 will develop a unidirectional magnetic component of force adjacent the cores of the appropriate sensing element; but that magnetic component of force will be one hundred and eighty degrees out of phase with the magnetic component of force which would be created within those cores if the movable contact of switch 74 had been shifted into its upper position. That unidirectional magnetic component of force will not be large enough to directly affect the magnetic field in the space that is above, but immediately adjacent, the turntable 36; but it will coact with the alternating magnetic field developed by the excitation windings 50 of that sensing element to cause the corresponding Helmholtz coil to develop a magnetic field which will, adjacent the magnetometer 42, substantially null that unidirectional component of force, and which will establish the desired magnetic component of force in the space that is above, but immediately adjacent, the turntable 36.

The meters 51 in the field control panels 56, 58 and 60 are preferably calibrated so they read in milligauss. Further, because those meters have the zero settings thereof at the centers of the scales thereof, the operator can easily set magnetic components of force of predetermined magnitude and orientation along the X-axis, the Y-axis and the Z-axis. In this simple and direct way, the operator can establish the desired magnetic field in the space that is above, but immediately adjacent, the turntable 36.

Once that magnetic field has been established, the magnetometer 42 will coact with the circuit and with the Helmholtz coils to compensate for any changes in the external magnetic field. Specifically, if a variation in the earth's magnetic field or if some man-made magnetic field affects the magnetic field in the space that is above, but immediately adjacent, the turntable 36, the magnetometer 42 and the circuit will coact with the Helmholtz coils to sufficiently change the components of magnetic force supplied by those Helmholtz coils to compensate for that change in the external magnetic field. As a result, once the operator has established the desired magnetic field in the space above, but immediately adjacent, the turntable 36, the magnetometer, the control circuit and the Helmholtz coils will automatically maintain that magnetic field.

The capacitor 200 is connected between the collector of transistor 162 and the base of transistor 156. That capacitor provides an integration action and thus acts to smooth out the pulses that are applied to the base of transistor 156 by the magnetic demodulator.

Capacitor 260 and resistor 262 are connected in series between junction 250 and the base of transistor 156. That capacitor and resistor provide negative feedback which tends to stabilize the operation of the D.C. amplifier and of the power amplifier.

It is frequently desirable to effect relative rotation between the device which is being calibrated and adjusted and the X-axis and Y-axis components of the magnetic field within which that device is disposed. Such relative rotation can frequently be effected by rotating the rotatable portion of the turntable 36, and thus rotating the device thereon, relative to the magnetic field established by the Helmholtz coils. However, in some cases it may be undesirable to rotate the rotatable portion of the turntable; or the devices may be moving along a production line. In those cases it would be desirable to leave the device undisturbed and to effectively rotate the X-axis and the Y-axis of the magnetic field. Such effective rotation is easily attained by use of the sine-cosine potentiometer 290 shown in FIG. 4.

That potentiometer has two terminals which are directly connected to ground, it has a terminal 292 which is connectable to the positive terminal 84 of power supply 90 by conductor 80, and it has a terminal 294 which is connectable to the negative terminal 88 of that power supply by conductor 82. Movable contact 296 has a terminal 300 connected thereto, and movable contact 298 has a terminal 302 connected thereto. The contacts 296 and 298 are spaced apart ninety degrees, but they move in unison.

In using the sine-cosine potentiometer 290 to effectively rotate the X-axis and the Y-axis of the magnetic field, the terminal 300 is connected to the jack 66 of the X-axis field control panel 56, the terminal 302 is connected to the jack 66 of the Y-axis field control panel 58, and the jacks 68 in both of those field control panels are grounded. As the contacts 296 and 298 are rotated through any given angle of rotation, the potentiometer 290 will vary the voltage across the field nulling winding 52 of sensing element 44 in accordance with the sine of that angle, and will vary the voltage across the field nulling winding 52 of sensing element 46 in accordance with the cosine of that angle. The magnetometer 42, the circuit, and the X-axis and Y-axis Helmholtz coils will respond to those variations in voltage to effectively rotate the X-axis and Y-axis components of the magnetic field relative to the space that is above, but immediately adjacent, the turntable 36.

Where desired, the terminals 300 and 302 of the sine-cosine potentiometer 290 could be connected to the jacks 66 in the field control panels 56 and 60; and, where that was done, the X-axis and Z-axis components of the magnetic field could be effectively rotated relative to the space that is above, but immediately adjacent, the turntable 36. Where desired, the terminals 300 and 302 of the sine-cosine potentiometer 290 could be connected to the jacks 66 in the field control panels 58 and 60; and, where that was done, the Y-axis and Z-axis components of the magnetic field could be effectively rotated relative to the space that is above, but immediately adjacent, the turntable 36.

A three-axis fluxgate magnetometer is preferred, but any direction sensitive magnetometer could be used. Similarly, while Helmholtz coils are preferred, Reuben's coils, the coils of a Braunbeck system, or other coils could be used. The circuit shown in the drawing is preferred, but other circuits could be used. Any such circuit would have to amplify the desired output of the magnetometer, would have to convert that output to a D.C. signal of the proper magnitude and polarity, would have to provide a feedback signal to the magnetometer, and would have to provide an output at the desired power and impedance level. The circuit shown in the drawing is particularly desirable because it has a low impedance input, it provides much of the voltage amplification in the two-stage A.C. tuned amplifier, it has a flat-top tuned circuit, it has a non-saturating characteristic, it uses a ring demodulator, and it integrates the signal.

If desired, an electromaget or a permanent magnet could be used to replace the field nulling winding 52 in any of the sensing elements of the magnetometer 42. That electromagnet or that permanent magnet would then establish the local magnetic field which is too small to directly affect the magnetic field in the space above, but immediately adjacent, the turntable 36 but which will enable the circuit and the Helmholtz coils to establish the desired magnetic field in that space. The magnitude of that local magnetic field could be adjusted by moving the electromagnet or the permanent magnet toward or away from the cores of the appropriate sensing element or, in the case of the electromagnet, by varying the current flow through it.

Any desired voltage could be applied to the jacks 66 and 68 in the field control panels 56, 58 and 60. Where desired, those voltages could be programmed by tapes, cards or the like. Signal rates up to ten cycles per second can be readily programmed.

The control system provided by the present invention effectively and automatically compensates for magnetic field variations due to changes in the earth's magnetic field, and also compensates for magnetic field variations due to man-made effects. Specifically, that control system effectively and automatically compensates for magnetic field variations due to the day-to-day variations in magnitude of the earth's magnetic field. Further, that control system effectively and automatically compensates for magnetic field variations due to such man-made effects as vehicles that pass close enough to the space where devices are to be calibrated or adjusted to distort the magnetic field in that space, changes in the current flowing through power lines which are close enough to the said space to distort the magnetic field in that space, and cranes, hoists, elevators, motors, and electric welders which are close enough to the said space to distort the magnetic field in that space. Not only does that control system compensate for such magnetic field variations, but it also maintains the magnetic field, of desired magnitude and orientation, which the operator selects and establishes within the said space.

In the said preferred embodiment of the control system provided by the present invention, that magnetic field can have any desired magnitude along the X-axis, the Y-axis or the Z-axis within a range of plus or minus six hundred milligauss. Further, in that said preferred embodiment, the magnetic field has a uniformity of six tenths of a milligauss within a radius of three inches from the point of intersection of the X-axis, the Y-axis and the Z-axis, and it has a uniformity of six milligauss within a radius of twelve inches from that point of intersection.

In the magnetometer and circuit shown in the drawing, the potentiometers 94 adjust the currents flowing through ment, the magnet field has a uniformity of six tenths of a the field signal pick up windings 54, and thus determine the magnitudes and orientations of the compensatory X-axis components, Y-axis components, and Z-axis components of the magnetic field generated by the Helmholtz coils. Also, in that magnetometer and circuit, the potentiometers 72 adjust the currents flowing through the field nulling windings 52, and thus determine the magnitudes and orientations of the predetermined X-axis components, Y-axis components, and Z-axis components of the magnetic field generated by the Helmholtz coils. Further, in that magnetometer and circuit, the sine-cosine potentiometer 290 is connected to the field nulling windings 52 of two of the sensing elements of the magnetometer to effectively rotate the magnetic field relative to the device on the turntable 36. If desired, however, the potentiometers 94, the potentiometers 72, and the sine-cosine potentiometer 290 could be suitably connected to the field signal pickup windings 54, could be suitably connected to the field nulling windings 52, or could be suitably connected to additional windings, not shown, on the cores of the sensing elements of the magnetometer. As a result, one or more windings on the sensing elements of the magnetometer can serve as the source of magnetic flux lines which affect that magnetometer but which can not directly affect the magnetic field in the space above, but immediately adjacent, the turntable 36.

Whereas the drawing and accompanying description have shown and described a preferred embodiment of the present invention it should be apparent to those skilled in the art that various changes may be made in the form of the invention without affecting the scope thereof.

What we claim is:

1. A control system which can establish and maintain a magnetic field of the desired magnitude and orientation within a space in which devices can be adjusted and which comprises:

(a) a pair of spaced apart turns of a Helmholtz coil that are set at opposite sides of said space and that define an X-axis, (b) a second set of spaced apart turns of a second Helmholtz coil that are set at opposite sides of said space and that define a Y-axis, (c) a third set of spaced apart turns of a third Helmholtz coil that are set at opposite sides of said space and that define a Z-axis, (d) a support which is disposed within said space and which can hold a device within said space adjacent the point of intersection of said X-axis, said Y-axis and said Z-axis, (e) a magnetometer which is mounted beneath said support but immediately adjacent said space, said magnetometer being a second harmonic fluxgate magnetometer with an X-axis sensing element, a Y-axis sensing element, and a Z-axis sensing element, (f) a circuit that extends between said magnetometer and said sets of spaced apart turns of said Helmholtz coils and that enables said magnetometer to control the values of current flowing through said Helmholtz coils, and thereby to control the magnetic field generated by said Helmholtz coils, (g) said magnetometer and said circuit and said Helmholtz coils being adapted to dynamically and automatically null, adjacent said magnetometer, the earth's magnetic field and any magnetic fields due to man-made effects, (h) a source of magnetic flux lines adjacent said magnetometer which can supply flux lines that are strong enough to affect said magnetometer but that are not strong enough to directly affect the magnetic field within said space, said source of magnetic flux lines being adjustable to provide magnetic flux lines of the desired magnitude and orientation, said source of magnetic flux lines being the field signal pickup windings of said sensing elements of said magnetometer, (i) said magnetometer and said circuit said Helmholtz coils being adapted to null, adjacent said magnetometer, said magnetic flux lines from said source of magnetic flux lines, and thereby provide a magnetic field in said space which differs from the composite magnetic field at said magnetometer by an amount which corresponds to the displacement of said magnetometer from said space, (j) a second source of magnetic flux lines adjacent said magnetometer which can supply flux lines that are strong enough to affect said magnetometer but that are not strong enough to directly affect the magnetic field within said space, said second source of magnetic flux lines being adjustable to provide magnetic flux lines of the desired magnitude and orientation, said second source of magnetic flux lines being the field nulling windings of said sensing elements of said magnetometer, (k) said magnetometer and said circuit and said Helmholtz coils being adapted to null, adjacent said magnetometer, said magnetic flux lines from said second source of magnetic flux lines, and thereby provide a magnetic field in said space which differs from the composite magnetic field at said magnetometer by a predetermined value, (l) said circuit including a magnetic demodulator, (m) said circuit providing D.C. amplification of the output of said magnetic demodulator, and (n) a sine-cosine potentiometer that is connectable to one of said sources of magnetic flux lines to effectively rotate two components of force of said magnetic field relative to said device held within said space.

2. A control system which can establish and maintain a magnetic field of the desired magnitude and orientation within a space in which devices can be disposed and which comprises:

(a) a pair of spaced apart turns of a Helmholtz coil that are set at opposite sides of said space and that define an X-axis, (b) a second set of spaced apart turns of a second Helmholtz coil that are set at opposite sides of said space and that define a Y-axis, (c) a third set of spaced apart turns of a third Helmholtz coil that are set at opposite sides of said space and that define a Z-axis, (d) a support which is disposed within said space and which can hold a device within said space, (e) a magnetometer which is displaced from said support but is immediately adjacent said space, said magnetometer being a second harmonic fluxgate magnetometer with an X-axis sensing element, a Y-axis sensing element, and a Z-axis sensing element, (f) a circuit that extends between said magnetometer and said sets of spaced apart turns of said Helmholtz coils and that enables said magnetometer to control the values of current flowing through said Helmholtz coils, and thereby to control the magnetic field generated by said Helmholtz coils, (g) said magnetometer and said circuit and said Helmholtz coils being adapted to dynamically and automatically null, adjacent said magnetometer, the earth's magnetic field and any magnetic fields due to man-made effects, (h) a source of magnetic flux lines adjacent said magnetometer which can supply flux lines that are strong enough to affect said magnetometer but that are not strong enough to directly affect the magnetic field within said space, said source of magnetic flux lines being adjustable to provide magnetic flux lines of the desired magnitude and orientation, said source of magnetic flux lines being the field pickup windings of said sensing elements of said magnetometer, (i) said magnetometer and said circuit and said Helmholtz coils being adapted to null, adjacent said magnetometer, said magnetic flux lines from said source of magnetic flux lines, and thereby provide a magnetic field in said space which differs from the composite magnetic field at said magnetometer by an amount which corresponds ot the displacement of said magnetometer from said space, and (j) a second source of magnetic flux lines adjacent said magnetometer which can supply flux lines that are strong enough to affect said magnetometer but that are not strong enough to directly affect the magnetic field within said space, said second source of magnetic flux lines being adjustable to provide magnetic flux lines of the desired magnitude and orientation, said second source of magnetic flux lines being the field nulling windings of said sensing elements of said magnetometer, (k) said magnetometer and said circuit and said Helmholtz coils being adapted to null, adjacent said magnetometer, said magnetic flux lines from said second source of magnetic flux lines, and thereby provide a magnetic field in said space which differs from the composite magnetic field at said magnetometer by a predetermined value.

3. A control system which can establish and maintain a magnetic field of the desired magnitude and orientation within a space in which devices can be disposed and which comprises:

(a) a pair of spaced apart turns of a Helmholtz coil that are set at opposite sides of said space and that define an X-axis, (b) a second set of spaced apart turns of a second Helmholtz coil that are set at opposite sides of said space and that define a Y-axis, (c) a third set of spaced apart turns of a third Helmholtz coil that are set at opposite sides of said space and that define a Z-axis, (d) a support which is disposed within said space and which can hold a device within said space, (e) a magnetometer which is displaced from said support but is immediately adjacent said space, said magnetometer being a direction sensitive magnetometer, (f) a circuit that extends between said magnetometer and said sets of spaced apart turns of said Helmholtz coils and that enables said magnetometer to control the values of current flowing through said Helmholtz coils, and thereby to control the magnetic field generated by said Helmholtz coils, (g) said magnetometer and said circuit and said Helmholtz coils being adapted to dynamically and automatically null, adjacent said magnetometer, the earth's magnetic field and any magnetic fields due to man-made effects, (h) a source of magnetic flux lines adjacent said magnetometer which can supply flux lines that are strong enough to affect said magnetometer but that are not strong enough to directly affect the magnetic field within said space, said source of magnetic flux lines being adjustable to provide magnetic flux lines of the desired magnitude and orientation, (i) said magnetometer and said circuit and said Helmholtz coils being adapted to null, adjacent said magnetometer, said magnetic flux lines from said source of magnetic flux lines, and thereby provide a magnetic field in said space which differs from the composite magnetic field at said magnetometer by an amount which corresponds to the displacement of said magnetometer from said space, and (j) a second source of magnetic flux lines adjacent said magnetometer which can supply flux lines that are strong enough to affect said magnetometer but that are not strong enough to directly affect the magnetic field within said space, said second source of magnetic flux lines being adjustable to provide magnetic flux lines of the desired magnitude and orientation, (k) said magnetometer and said circuit and said Helmholtz coils being adapted to null, adjacent said magnetometer, said magnetic flux lines from said second source of magnetic flux lines, and thereby provide a magnetic field in said space which differs from the composite magnetic field at said magnetometer by a predetermined value.

4. A control system which can establish and maintain a magnetic field of the desired magnitude and orientation within a space in which devices can be disposed and which comprises:

(a) a pair of spaced apart turns of a Helmholtz coil that are set at opposite sides of said space and that define an X-axis, (b) a second set of spaced apart turns of a second Helmholtz coil that are set at opposite sides of said space and that define a Y-axis, (c) a third set of spaced apart turns of a third Helmholtz coil that are set at opposite sides of said space and that define a Z-axis, (d) a support which is disposed within said space and which can hold a device within said space, (e) a magnetometer which is displaced from said support but is immediately adjacent said space, (f) a circuit that extends between said magnetometer and said sets of spaced apart turns of said Helmholtz coils and that enables said magnetometer to control the values of current flowing through said Helmholtz coils, and thereby to control the magnetic field generated by said Helmholtz coils, (g) said magnetometer and said circuit and said Helmholtz coils being adapted to dynamically and automatically null, adjacent said magnetometer, the earth's magnetic field and any magnetic fields due to man-made effects, (h) a source of magnetic flux lines adjacent said magnetometer which can supply flux lines that are strong enough to affect said magnetometer but that are not strong enough to directly affect the magnetic field within said space, (i) said magnetometer and said circuit and said Helmholtz coils being adapted to null, adjacent said magnetometer, said magnetic flux lines from said source of magnetic flux lines, and thereby provide a magnetic field in said space which differs from the composite magnetic field at said magnetometer by an amount which corresponds to the displacement of said magnetometer from said space, and (j) a second source of magnetic flux lines adjacent said magnetometer which can supply flux lines that are strong enough to affect said magnetometer but are not strong enough to directly affect the magnetic field within said space, (k) said magnetometer and said circuit and said Helmholtz coils being adapted to null, adjacent said magnetometer, said magnetic flux lines from said second source of magnetic flux lines, and thereby provide a magnetic field in said space which differs from the composite magnetic field at said magnetometer by a predetermined value.

5. A control system which can establish and maintain a magnetic field of the desired magnitude and orientation within a space in which devices can be disposed and which comprises:

(a) a set of spaced apart turns of a coil that are disposed at opposite sides of said space and that define an X-axis, (b) a second set of spaced apart turns of a second coil that are disposed at opposite sides of said space and that define a Y-axis, (c) a third set of spaced apart turns of a third coil that are disposed at opposite sides of said space and that define a Z-axis, (d) a support which is disposed within said space and which can hold a device within said space, (e) a magnetometer which is displaced from said support but is located directly between said spaced apart turns of the first said and said second and said third coils and which is immediately adjacent said space so it is subject to essentially the same magnetic field which said coils apply to said device within said space said magnetometer being a direction sensitive magnetometer, (f) a circuit that extends between said magnetometer and said sets of spaced apart turns of said coils and that enables said magnetometer to control the values of current flowing through said coils, and thereby to control the magnetic field generated by said coils, (g) said magnetometer and said circuit and said coils being adapted to dynamically and automatically null, adjacent said magnetometer, and thus to substantially null in said space, the earth's magnetic field and any magnetic fields due to man-made effects, and (h) a source of magnetic flux disposed within the spaced adjacent said magnetometer which can supply flux lines that are strong enough to affect said magnetometer but that are not strong enough to directly affect the magnetic field within said space whereby said magnetometer is subject to the magnetic field developed by said coils and also to the flux lines from said source of magnetic flux lines, said source of magnetic flux lines being adjustable to provide magnetic flux lines of the desired magnitude and orientation, (i) said magnetometer and said circuit and said coils being adapted to null, adjacent said magnetometer, said magnetic flux lines from said source of magnetic flux lines, and thereby provide a magnetic field in said space which differs from the composite magnetic field of said magnetometer by a predetermined value.

6. A control system which can establish and maintain a magnetic field of the desired magnitude and orientation within a space in which devices can be disposed and which comprises:

(a) a set of spaced apart turns of a coil that are disposed at opposite sides of said space and that define a first axis, (b) a second set of spaced turns of a second coil that are disposed at opposite sides of said space and that define a second axis which is angularly displaced from the first said axis, (c) a support which can hold a device within said space, (d) a magnetometer located directly between said spaced apart turns of the first said and said second coils so it is subject to essentially the same magnetic field which said coils apply to said device within said space, (e) a circuit that extends between said magnetometer and said sets of spaced apart turns of said coils and that enables said magnetometer to control the values of current flowing through said coils, and thereby to control the magnetic field generated by said coils, (f) said magnetometer and said circuit and said coils being adapted to dynamically and automatically null, adjacent said magnetometer, and thus to substantially null in said space, undesired components of the earth's magnetic field and of any magnetic fields due to man-made effects, and (g) a source of magnetic flux lines disposed within the spaced adjacent said magnetometer which can supply flux lines that are strong enough to affect said magnetometer but that are not strong enough to directly affect the magnetic field within a predetermined portion of said space whereby said magnetometer is subject to the magnetic field developed by said coils and also to the flux lines from said source of magnetic flux lines, (h) said magnetometer and said circuit and said coils being adapted to null, adjacent said magnetometer, said magnetic flux lines from said source of magnetic flux lines, and thereby provide a magnetic field in said predetermined portion of said space which differs from the composite magnetic field at said magnetometer by a predetermined value.

7. A control system which can establish and maintain a magnetic field of the desired magnitude and orientation within a space in which devices can be disposed and which comprises:

(a) a set of spaced apart turns of a coil that are disposed at opposite sides of said space and that define a first axis, (b) a second set of spaced apart turns of a second coil that are disposed at opposite sides of said space and that define a second axis which is angularly displaced from the first said axis, (c) a support which hold a device within said space, (d) a magnetometer, (e) a circuit that extends between said magnetometer and said sets of spaced apart turns of said coils and that enables said magnetometer to control the values of current flowing through said coils, and thereby to control the magnetic field generated by said coils, (f) said magnetometer and said circuit and said coils being adapted to dynamically and automatically null, adjacent said magnetometer, undesired components of the earth's magnetic field and of any magnetic fields due to man-made effects, (g) a source of magnetic flux lines adjacent said magnetometer which can supply flux lines that are strong enough to affect said magnetometer but that are not strong enough to directly affect the magnetic field within a predetermined portion of said space, (h) said magnetometer and said circuit and said coils being adapted to null, adjacent said magnetometer, said magnetic flux lines from said source of magnetic flux lines, and thereby provide a magnetic field in said predetermined portion of said space which differs from the composite magnetic field at said magnetometer by a predetermined value, and (i) a sine-cosine potentiometer that is connectable to said source of mangetic flux lines to effectively rotate two components of said magnetic field relative to said device within said space.

8. A control system which can establish and maintain a magnetic field of the desired magnitude and orientation within a space in which devices can be disposed and which comprises:

(a) a set of spaced apart turns of a coil that are disposed at opposite sides of said space and that define an X-axis, (b) a second set of spaced apart turns of a second coil that are disposed at opposite sides of said space and that define a Y-axis, (c) a third set of spaced apart turns of a third coil that are disposed at opposite sides of said space and that define a Z-axis, (d) a support which is disposed within said space and which can hold a device within said space, (e) a magnetometer which is displaced from said support but is located directly between said spaced apart turns of the first said and said second and said third coils and which is immediately adjacent said space so it is subject to essentially the same magnetic field which said coils apply to said device within said space, (f) a circuit that extends between said magnetometer and said sets of spaced apart turns of said coils and that enables said magnetometer to control the values of current flowing through said coils, and thereby to control the magnetic field generated by said coils, (g) said magnetometer and said circuit and said coils being adapted to dynamically and automatically null, adjacent said magnetometer, and thus to substantially null in said space, the earth's magnetic field and any magnetic fields due to man-made effects, and (h) a source of magnetic flux lines disposed within the spaced adjacent said magnetometer which can supply flux lines that are strong enough to affect said magnetometer but that are not strong enough to directly affect the magnetic field within said space whereby said magnetometer is subject to the magnetic field developed by said coils and also to the flux lines from said source of magnetic flux lines, (i) said magnetometer and said circuit and said coils being adapted to null, adjacent said magnetometer, said magnetic flux lines from said source of magnetic flux lines, and thereby provide a magnetic field in said space which differs from the composite magnetic field at said magnetometer by a predetermined value.

9. A control system which can establish and maintain a magnetic field of the desired magnitude and orientation within a space in which devices can be disposed and which comprises:

(a) a coil that has spaced apart turns and that defines an axis in a space in which devices can be disposed, (b) a magnetometer located directly between said spaced apart turns of said coil so it is subject to essentially the same magnetic field which said coil applies to said devices within said space, (c) a circuit that extends between said magnetometer and said coil and that enables said magnetometer to control the values of current flowing through said coil, and thereby to control the magnetic field generated by said coil, (d) said magnetometer and said circuit and said coil being adapted to dynamically and automatically null, adjacent said magnetometer, and thus to substantially null in said space, undesired components of the earth's magnetic field and of any magnetic fields due to man-made effects, and (e) a source of magnetic flux lines disposed within the spaced adjacent said magnetometer which can supply flux lines that are strong enough to affect said magnetometer but that are not strong enough to directly affect the magnetic field within a predetermined portion of said space whereby said magnetometer is subject to the magnetic field developed by said coil and also to the flux lines from said source of magnetic flux lines, (f) said magnetometer and said circuit and said coil being adapted to null, adjacent said magnetometer, said magnetic flux lines from said source of magnetic flux lines, and thereby provide a magnetic field in said predetermined portion of said space which differs from the composite magnetic field at said magnetometer by a predetermined value.

10. A control system which can establish and maintain a magnetic field of the desired magnitude and orientation within a space in which devices can be disposed and which comprises:

(a) a set of spaced apart turns of a coil that are disposed at opposite sides of said space and that define a first axis, (b) a second set of spaced apart turns of a second coil that are disposed at opposite sides of said space and that define a second axis which is angularly displaced from the said axis, (c) a support which can hold a device within said space, (d) a magnetometer, (e) a circuit that extends between said magnetometer and said sets of spaced apart turns of said coils and that enables said magnetometer to control the values of current flowing through said coils, and thereby to control the magnetic field generated by said coils, (f) said magnetometer and said circuit and said coils being adapted to dynamically and automatically null, adjacent said magnetometer, undesired components of the earth's magnetic field and of any magnetic fields due to man-made effects, and (g) a source of magnetic flux lines adjacent said magnetometer which can supply flux lines that are strong enough to affect said magnetometer but that are not strong enough to directly affect the magnetic field within a predetermined portion of said space, (h) said magnetometer and said circuit and said coils being adapted to null, adjacent said magnetometer, said magnetic flux lines from said source of magnetic flux lines, and thereby provide a magnetic field in said predetermined portion of said space which differs from the composite magnetic field at said magnetometer by a predetermined value, (i) said source of magnetic flux lines being selectively energizable to effectively rotate said magnetic field relative to said device within said space.

References Cited

UNITED STATES PATENTS

| | | | |
|---|---|---|---|
| 3,080,507 | 3/1963 | Wickerham et al. | 324—43 |
| 2,507,301 | 5/1950 | Fulbright | 317—123 |
| 2,697,186 | 12/1954 | Anderson | 317—157.5 X |
| 2,715,198 | 8/1955 | Tolles | 324—43 X |
| 2,802,983 | 8/1957 | Tolles | 324—43 |
| 2,834,939 | 5/1958 | Tolles | 324—43 |

FOREIGN PATENTS

| | | |
|---|---|---|
| 604,329 | 7/1948 | Great Britain. |

OTHER REFERENCES

Scott, G. G., "Compensation of the Earth's Magnetic Field," the Review of Scientific Instruments, volume 28, No. 4, pp. 270–273, April 1957.

Marzetta, "Use of an Operational Amplifier with Helmholtz Coils for Reducing AC Induced Magnetic Fields," The Review of Scientific Instruments, vol. 32, No. 11, November 1961 pp. 1192–1195.

RUDOLPH V. ROLINEC, *Primary Examiner.*

S. B. GREEN, R. J. CORCORAN, *Assistant Examiners.*